United States Patent [19]

LeGrand et al.

[11] Patent Number: 4,894,282

[45] Date of Patent: * Jan. 16, 1990

[54] SAFETY IMPACT RESISTANT LAMINATES HAVING IMPROVED INTERLAYER MATERIALS

[75] Inventors: Donald G. LeGrand, Burnt Hills; William V. Olszewski, Stillwater, both of N.Y.

[73] Assignee: General Electric Company, Pittsfield, Mass.

[*] Notice: The portion of the term of this patent subsequent to Jul. 28, 2004 has been disclaimed.

[21] Appl. No.: 169,077

[22] Filed: Mar. 16, 1988

Related U.S. Application Data

[63] Continuation of Ser. No. 870,664, Jun. 2, 1986, abandoned, which is a continuation of Ser. No. 652,896, Sep. 21, 1989, abandoned.

[51] Int. Cl.$^4$ .................. B32B 17/10; B32B 27/36
[52] U.S. Cl. ........................... 428/332; 156/99; 156/103; 156/104; 156/106; 156/306.6; 428/336; 428/412; 428/415; 428/426
[58] Field of Search ............... 428/412, 174, 442, 426, 428/415, 419, 425.6, 516, 517, 429, 437, 441, 447; 156/99, 103, 104, 106, 306.6; 228/30

[56] References Cited

U.S. PATENT DOCUMENTS

| | | | |
|---|---|---|---|
| 2,526,723 | 10/1950 | Burk et al. | 228/30 |
| 3,406,086 | 10/1960 | Foster | 428/412 |
| 3,520,768 | 7/1970 | Peilstocker et al. | 428/174 |
| 3,666,614 | 5/1972 | Snedecker et al. | 428/412 |
| 4,683,172 | 7/1987 | LeGrand et al. | 428/442 X |

*Primary Examiner*—Thomas J. Herbert
*Attorney, Agent, or Firm*—Spencer D. Conrad

[57] ABSTRACT

Safety or impact resistant laminates are disclosed containing a plurality of laminae and at least on composite interlayer said composite interposed between and bonding any two of the laminae and containing one or more thermoplastic sheets from about 1 to about 30 mils in combined thickness bonded one to another and on each external face by a contact or pressure sensitive adhesive layer.

2 Claims, No Drawings

SAFETY IMPACT RESISTANT LAMINATES HAVING IMPROVED INTERLAYER MATERIALS

This is a continuation of application Ser. No. 870,664 filed 06/02/86 now abandoned which is a continuation of Ser. No. 652,896 filed 09/21/84 now abandoned.

This invention relates to improvements to laminated, thermoplastic and/or glass structures through the provision of new interlayer materials. More particularly this invention relates to contact or pressure sensitive adhesive coated thermoplastic interlayers for use in the production of safety and penetration resistant laminates and to their method of manufacture.

BACKGROUND OF THE INVENTION

Safety and penetration resistant laminates having thermoplastic and/or glass laminae are usually bonded together by adhesive interlayers of a polymeric material. Unlike the structural laminae, the interlayer material is highly elastomeric to provide better adhesion and relieve stresses in the laminate.

As criteria for selection, the interlayer material must have: (1) a high impact energy absorption level so that it may withstand high impact from moving objects, high tensile strength and high percentage of elongation are measures of this property; (2) good shear and tear strength to prevent rupture from the broken laminae; (3) good adhesion to the laminae so as to bond the laminate and to prevent broken pieces of the laminate from flying and causing injury; (4) good optical transparency; and (5) good weathering characteristics.

Although various primers have been used to increase adhesion, the interlayer materials to date have been self adhesive, that is the interlayer is an adhesive material which also possesses the above criteria. U.S. Pat. No. 3,666,614 discloses interlayer materials in which the adhesive properties are activated by the use of heat and pressure. U.K. Pat. No. 2,015,427 discloses interlayer materials wherein the adhesive properties are activated by the use of UV radiation.

While the interlayer materials disclosed by the above patents have worked well, it is very difficult to obtain the optimum combination of the above given criteria. A material which exhibits desirable adhesion may be lacking in shear and tear strength or high impact energy absorption. Fashioning an interlayer material with an optimum level in each area of the above criteria is a widely recognized problem in the art.

Further, the interlayer materials disclosed above require much capital investment and many man hours in constructing laminates which contain them. For example, the great majority of safety and penetration resistant laminates are laid-up and bonded using interlayer materials in which the adhesive properties are activated by heat and pressure.

Heat and pressure bonding is conducted in batches usually at temperatures ranging from about 80° C. to 205° C and preferably from about 110° C to about 140° C; and at pressures of from about 2 to 300 p.s.i., and preferably at pressures of from about 150 to about 250 p.s.i. The bonding is conducted in autoclaves, hydraulic presses, and similar devices. It is recognized in the art that such methods are cumbersome and result in laminates containing residual stress especially where diverse laminae are bonded.

Thus, interlayers in use today suffer from two recognized drawbacks: the difficulty of obtaining all essential physical properties at their optimum level in a homogeneous interlayer material and the cumbersome process of activating the adhesive characteristics of the interlayer material.

Therefore, it is an object of the present invention to provide a laminate containing a composite interlayer with the various constituents of the composite interlayer directed towards providing various necessary physical properties.

It is another object of the present invention to provide a laminate containing a composite interlayer including a thermoplastic sheet bonded on two faces with a contact or pressure sensitive adhesive.

It is another object of the present invention to provide a laminate containing a composite interlayer including a polycarbonate ply bonded on two faces with a contact or pressure sensitive adhesive.

It is yet another object of the present invention to provide a laminate containing a composite interlayer material which avoids the use of cumbersome processes in the bonding of laminates.

DESCRIPTION OF THE INVENTION

Briefly, according to the present invention, there are provided safety or penetration resistant laminates having a plurality of thermoplastic and/or glass laminae and at least one composite interlayer which composite interlayer is situated between and bonding any two of said laminae and contains one or more thermoplastic sheets from about 1 to about 30 mils in combined thickness bonded one to another and on each external face by a contact or pressure sensitive adhesive. Preferably, all adjoining laminae are bonded by such a composite interlayer.

The laminae of the instant invention may be thermoplastic or glass and combinations thereof. Usually, the laminae have thicknesses ranging between about 60 mils to about 500 mils, but laminae of thicknesses outside this range are common, for instance, back spall resistant laminae may range from 30 mils to 125 mils.

The glass which is to be employed as laminae herein encompasses all types of glass that have been commonly used in the preparation of laminates. Thus, the glass might be common plate glass, thermally tempered glass, chemically tempered glass, or other appropriate types. An example of the chemically tempered glass is that which has been treated chemically with salts in an ion-exchange type process to give a higher tensile and flexural strength glass. A glass treating process of this type is disclosed in U.S. 3,395,998. Tempered glasses are available commercially and are marketed by such companies, as Pittsburgh Plate Glass Company of Pittsburgh, Pa. (thermal tempered glass) and Corning Glass Works, of Elmira, N.Y. (chemically tempered glass). The lamina of the above described glass may be of any thickness required in the laminate.

The glass may be transparent, translucent, opaque, and/or tinted, as the application may require. The glass may also contain or have on its surface salts and/or metal oxides that will respond to or conduct an electric current and this allow such glass to be heated by electric current.

Thermoplastics suitable for use as laminae or as a sheet of the composite interlayer include any of the common thermoplastics which are extrudable into film or sheet. Suitable thermoplastics include acrylic and methacrylic polymers or copolymers; acetal homopolymers; acetal copolymers produced by polymerization or trioxane and ethylene oxide; epoxy resins; polycarbonate; polyetherimides; phenylene oxide based resins such as polyphenylene oxide and blends of polyphenylene oxide and styrene resins; polyaryl ethers; polyesters; polyethylene; polyphenylene sulfides; polypropylene; polysulfones; ethylene polymers such as ethyl vinyl acetates; conductive plastics; and ordered aromatic copolymers, etc.

The preferred thermoplastic for use herein is polycarbonate. Any of the usual polycarbonate resins can be used including but not limited to those described in U.S. Patent Nos. 3,161,615; 3,220,973; 3,312,659; 3,312,660; 3,313,777; 3,666,614; among others, all of which are included herein by reference. Preferred polycarbonate resins are the aromatic polycarbonate resins.

The composite interlayer of the present invention has one or more plies of thermoplastic sheet from about 1 to about 30 mils in combined thickness having adhered to either side of each such sheet thereof a film of contact or pressure sensitive adhesive from about ½ to about 5 mils in thickness. Pressure sensitive or contact adhesives suitable for use in the present invention must provide for goo adhesion, cohesion, and tack as well as possess, excellent optical clarity. Furthermore, the adhesive must maintain this clarity, adhesion, and cohesion on exposure to oxygen and sunlight during prolonged periods of outdoor use.

Presently, suitable pressure sensitive adhesives are thermoplastic or crosslinked polymers for example styrene-diene based polymers such as, styrene-butadiene copolymers or styrene-isoprene-styrene copolymers; ethylene based polymers such as, ethyl vinyl acetate copolymers and ethyl vinyl acetate acid terpolymers; and acrylic based polymers, such as 2-ethyl hexyl acrylate copolymerized with a small amount of acrylamide. Preferably, the adhesive is lightly cross-linked.

The pressure sensitive adhesive may be manufactured by any common method known in the adhesives industry, such as, methods involving a non-aggressive solvent, a hot melt, a UV cure, an aqueous emulsion or others. Although great progress is presently being made to improve the tack, cohesion, and adhesion of pressure sensitive adhesives produced by any of the above methods, the solvent-borne adhesives are still preferred because of their physical properties.

The preferred pressure sensitive adhesives are the acrylic based polymers made by the free radical polymerization of primarily acrylate ester monomers. Often, these polymers contain minor portions of other non-acrylic comonomers, which enhance certain physical or performance properties of the polymer or provide reactive sites for cross-linking. Thus, the term "acrylic" herein refers to the spectrum of pressure sensitive polymers containing acrylate as well as lesser portions of non acrylate monomers. Typically, the acrylate pressure sensitive adhesives are a copolymer of a higher alkyl acrylate copolymerized with a lesser portion of a polar comonomer. Suitable polar comonomers are acrylic acid, acrylamide, maleic anhydride, diacetone acrylamide, and long chain alkyl acrylamides.

Also present in the contact or pressure sensitive adhesive may be tackifiers, plasticizers, fillers, antioxidants, and ultraviolet light screens. These additives must be selected to be compatible with adjoining substrates or layers unless appropriate protective measures are taken. Particularly these additives must be compatible with thermoplastic polycarbonate resins.

The preferred adhesive contains an ultraviolet light screen. Ultraviolet light may degrade both the adhesive and the substrate such as a polycarbonate substrate to which the adhesive is adhered.

Some non-limiting examples of suitable ultraviolet light absorbing compounds are benzophenone derivatives such as 2,2'-dihydroxybenzophenone, 2,2'-dihydroxy-4,4'-dimethyloxybenzophenone, 2,2'-dihydroxy-4,4'-diethyloxybenzophenone, 2,2'-dihydroxy-4,4'-dipropoxybenzophenone, 2,2'-dihydroxy-4,4'-dihydroxy-4,4'-dibutoxybenzoby phenone, 2,2'-dihydroxy-4-methoxy-4'-propoxybenzophenone, and the like; benzotriazole derivatives such as 2-(2'-hydroxy-5'-methylphenyl)benzotriazole, 2-(2'-hydroxy-3'-methyl-5'-tert-butylphenyl) benzotriazole, and the like.

Illustrative of suitable contact or pressure sensitive adhesives is the V-22 adhesive manufactured by FLEXcon Company of Spencer, Ma. This adhesive material is an ultra clear thermoset acrylic copolymer having good water and humidity stability and is obtainable as a polyester reinforced sheet with a release liner on both sides for two sided bonding.

The laminates of the present invention may be constructed from laminae and composite interlayers as a continuous sheet or in individual batches. For example, a roll tacking process could be used to produce a continuous laminate by passing continuous laminae and composite interlayers arranged in the desired order between two rollers preset to apply a proper tacking pressure. Also, a batch press process could be used to construct laminates by tacking the laminae together as single sheets in the proper order. The major requirements of such processes are that sufficient pressure be applied so as to properly adhere the pressure sensitive adhesive and that the laminae and composite interlayers be brought into contact in such a way as to expel the air between them.

Flexible laminae facilitate the construction of the laminate by more easily allowing the surfaces to be joined. Both the roll tacking and batch press process require at least some degree of flexibility in the laminae to facilitate proper alignment and elimination of air pockets. Those people skilled in the practice of such processes can determine the degree of flexibility required.

To minimize the formation of air bubbles between the laminae and composite interlayers, a thin film of water solution containing a surfactant such as soap may be applied to each interface during bonding.

Preferably, the composite interlayer is preconstructed at some time prior to the bonding of the laminate. In such preconstruction process, the adhesive may be applied to the thermoplastic sheet in a variety of ways, for example, in a non-aggressive solvent solution, as a hot metal, as a UV curable liquid, etc. However double sided contact or pressure sensitive adhesive sheets may be formed by any of these methods, laid up in the laminate with the thermoplastic sheet without an initial prebonding step and all bonding within the laminate simultaneously effected by a roll tack process or batch press process.

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified and the polycarbonate resin is a polycarbonate of 2,2'-bis(4-hydroxyphenol) propane.

EXAMPLE 1

A 12"×12" adhesive interlayer was constructed by hand consisting of the following layers in the following order: 3 mil V-22 acrylic adhesive/5 mil polycarbonate/3 mil V-22 acrylic adhesive/5 mil polycarbonate/3 mil V-22 acrylic adhesive/5 mil polycarbonate/3 mil V-22 acrylic adhesive. The resulting adhesive interlayer had visible flaws and air pockets due to the manual construction but was otherwise transparent and tacky on its external surface.

EXAMPLE 2

A 12"×12" laminate was constructed by hand using the above adhesive interlayer to bond the following laminae in the following order: 125 mil polycarbonate/adhesive interlayer/250 mil polycarbonate/adhesive interlayer/250 mil polycarbonate/adhesive interlayer/125 mil polycarbonate. The resulting laminate had visible flaws and air pockets due to the manual construction but was otherwise transparent. When shot from a distance of 15 ft. with a 0.44 caliber pistol having a muzzle velocity of approximately 1400 ft/sec the bullet was stopped at the forward face of the second 250 mil polycarbonate lamina with minor dimpling or yielding of the back 125 mil polycarbonate laminae.

EXAMPLE 3

A laminate was constructed according to a conventional hot press methods identical in dimension and composition to the laminate of Example 2 except that the interlayer was a polydiorganosiloxanepolycarbonate block copolymer. When tested under the test conditions of Example 2, the bullet was stopped inside the second 250 mil polycarbonate lamina with substantial dimpling or yielding of the back 125 mil polycarbonate lamina.

What is claimed is:

1. A method for bonding safety and penetration resistant laminates which consists essentially of contacting under pressure a plurality of laminae selected from the group consisting of glass laminae and thermoplastic laminae where there is situated between adjacent laminae a composite pressure sensitive adhesive inner layer comprising:
   (i) at least one thermoplastic sheet having a combined thickness of about 1 to 30 mils, and
   (ii) a pressure sensitive adhesive sheet adhered to each face of said thermoplastic sheet.
2. A laminate produced by the method of claim 11.

* * * * *